UNITED STATES PATENT OFFICE.

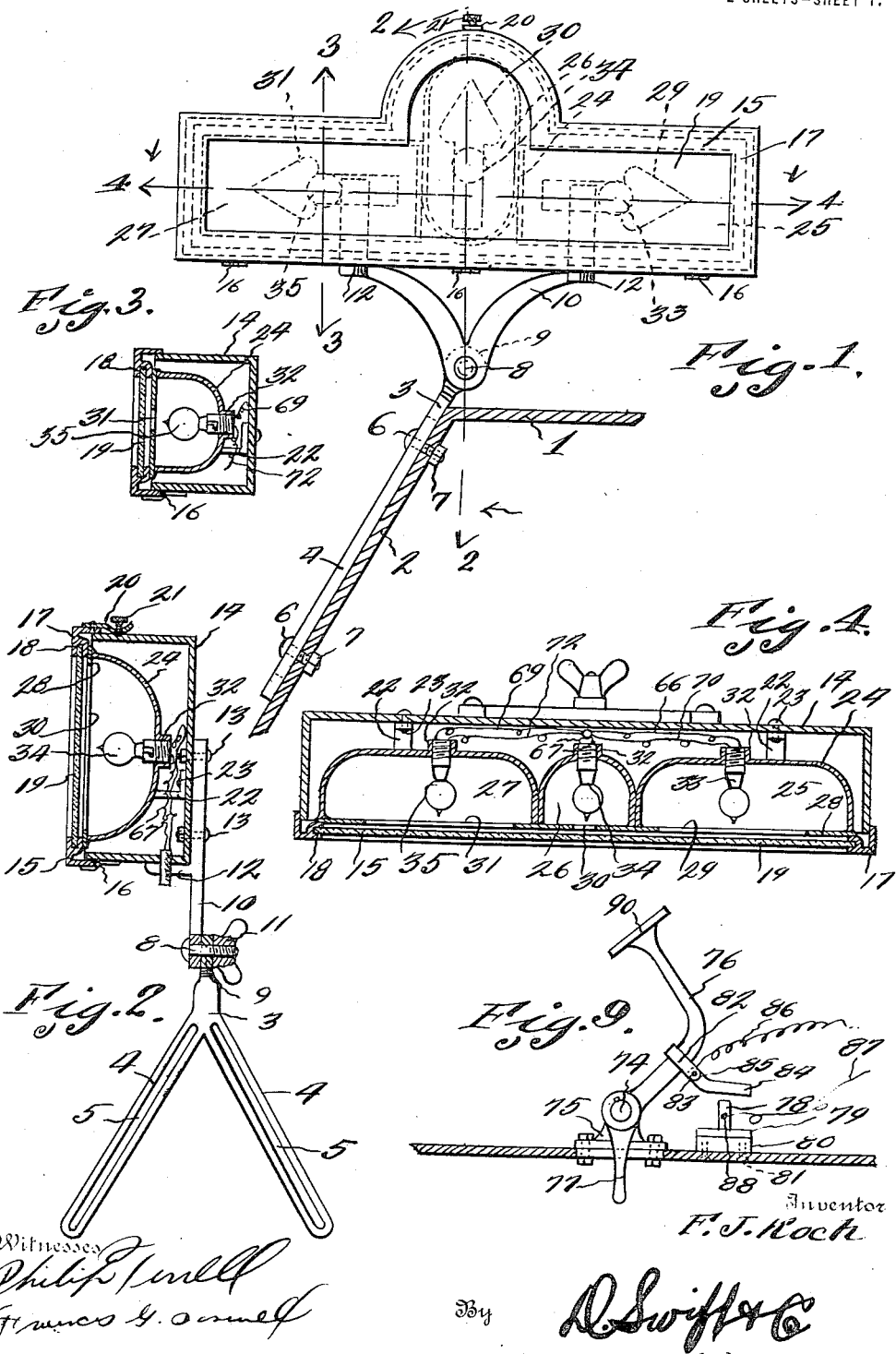
F. J. KOCH.
TRAFFIC SIGNAL FOR AUTOMOBILES.
APPLICATION FILED JULY 21, 1916.
1,244,990.
Patented Oct. 30, 1917.
2 SHEETS—SHEET 1.

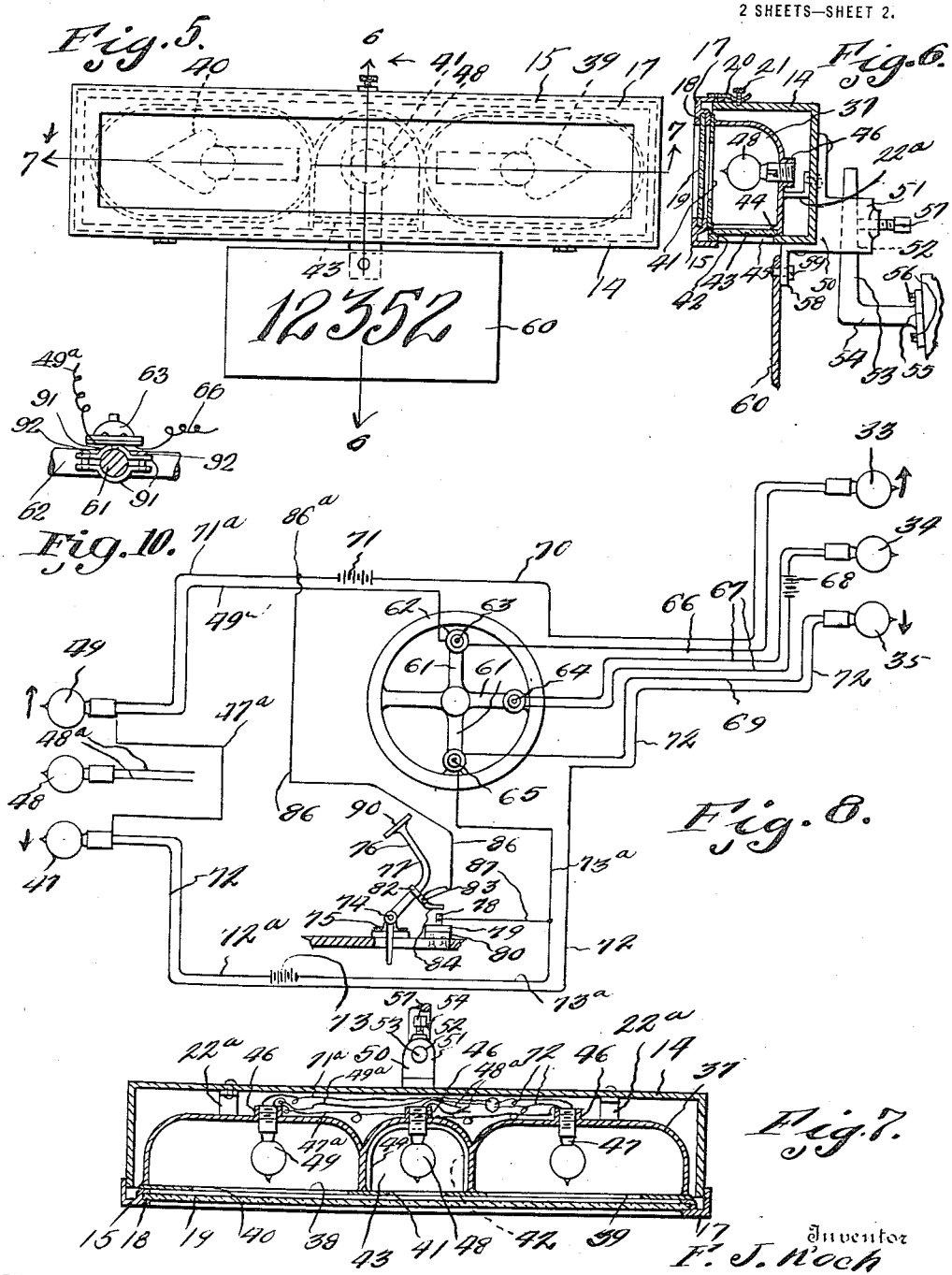

FRED J. KOCH, OF NEW BADEN, ILLINOIS.

TRAFFIC-SIGNAL FOR AUTOMOBILES.

1,244,990.

Specification of Letters Patent.

Patented Oct. 30, 1917.

Application filed July 21, 1916. Serial No. 110,543.

*To all whom it may concern:*

Be it known that I, FRED J. KOCH, a citizen of the United States, residing at New Baden, in the county of Clinton, State of Illinois, have invented a new and useful Traffic-Signal for Automobiles; and I do hereby declare the following to be a full, clear, and exact description of the invention, such as will enable others skilled in the art to which it appertains to make and use the same.

This invention relates to a useful and improved traffic signal for automobiles one to be carried by the forward end of the machine, and another at the rear so as to indicate to the traffic officer whether or not the machine will keep straight ahead or will turn to the right or to the left, and to indicate to a following machine, whether or not the automobile will turn to the right or the left or slow up.

Another object of the invention is the provision of means located adjacent the steering wheel, whereby the operator may actuate either the right or the left front signals at the same time with the corresponding signal at the rear.

Another object of the invention is to provide pedal actuating means for operating both right and left signals of the rear simultaneously, whereby the operator may signal to the machine in the rear, that the intention is to slow up.

Another object of the invention is to provide a casing for the signal provided with reflectors therein carrying electric light bulbs and provided with a stencil having arrow shaped openings therein, whereby the light from the bulbs may be reflected through said openings.

In practical fields, the details of construction may necessitate alterations falling within the scope of what is claimed.

The invention comprises further features and combination of parts, as hereinafter set forth, shown in the drawings and claimed.

In the drawings:

Figure 1 is a view in elevation of the forward traffic signal, showing the inside inclined portion of the wheel guard (to which the forward signal is attached) in section.

Fig. 2 is a sectional view on line 2—2 of Fig. 1.

Fig. 3 is a sectional view on line 3—3 of Fig. 1.

Fig. 4 is a longitudinal sectional view on line 4—4 of Fig. 1.

Fig. 5 is a view in elevation of the traffic signal.

Fig. 6 is a sectional view on line 6—6 of Fig. 5.

Fig. 7 is a longitudinal sectional view on line 7—7 of Fig. 5.

Fig. 8 is a diagrammatic view showing the forward and rear lights of the forward and rear signals and the electric wiring, and the means for controlling the lights, as arranged adjacent the steering wheel.

Fig. 9 is an enlarged detail view in side elevation of the means to be actuated by the foot of the operator for controlling the two, both the right and left signals at the same time or in series.

Fig. 10 is a detail sectional view showing the means for clamping one of the push buttons for controlling the lights to one of the spokes of the steering wheel.

Referring more especially to the drawings, 1 designates the wheel guard of the left hand side of the machine, and arranged upon the inclined portion 2 of the guard is a member 3 having diverging arms 4 provided with slots 5, through which the bolts 6 extend and through the inclined portion 2, to secure the member 3 in position, said bolts 6 being provided with nuts 7. A bolt 8 extends through the ear 9 of the member 3, and pivoted upon said bolt is a bracket 10, there being a winged nut 11 carried by the bolt, whereby the bracket 10 may be held and pivoted in adjusted positions. The bracket 10 has laterally extending arms 12 which terminate in L-shaped parts, the vertical portions of which are secured to a casing 14 by the bolts 13. The casing 14 has a closure 15 connected thereto by the hinges 16. The closure 15 consists of a suitable frame 17 having a channel 18, to receive a sheet of glass 19, which may be any suitable color, preferably ruby red. Carried by the closure is a clip 20 having a thumb screw 21 threaded therein, and which partly threads into the upper wall of the casing 14, thereby holding the member 15 closed. Carried by a bracket 22 (which is secured at 23 to the inner face of the rear wall of the casing 14) is a reflector casing 24 of the shape shown in the drawings. As will be seen, the reflector casing comprises the three compartments 25, 26, and 27. Carried by the front edge of the reflector casing is a suitable stencil 28, which is provided with three arrow shaped openings 29, 30 and 31. The central arrow shaped opening 30 is disposed vertically, thereby indicating the straight ahead direction of the automobile. The arrow shaped opening 29 indicates the direction toward the left, while the arrow shaped opening 31 indicates the direction toward the right, that is, when a bulb is lighted behind the respective openings. Threaded in suitable sockets 32 of the rear walls of said compartments 25, 26 and 27 are the electric light bulbs 33, 34 and 35. The casing of the rear traffic signal, and the closure and the ruby sheet of glass are substantially the same construction as the corresponding parts of the forward traffic signal, and said parts of the rear signal are designated by the same characters as those of the forward signal. However, the reflector casing 37 of the rear traffic signal is slightly modified in that the stencil 38 is provided with two arrow shaped openings 39 and 40 and a central circular opening 41. The ruby glass of the circular central opening 41 displays a red light, so as to take place of the usual tail light upon all automobiles, and the bulb behind this ruby glass is always lighted for this purpose, that is, at night time. The opening 39 indicates the direction of the automobile toward the right, and the opening 40 indicates the direction of the automobile toward the left. The reflector casing 37 of the rear traffic signal is further modified to that of the forward signal, in that the lower wall of the casing 37 adjacent its central portion has an opening 42, which is covered by a white glass 43 arranged under the flange 44, which also covers the opening 45 in the lower wall of the casing 14 of the rear traffic signal. Threaded into sockets 46 of the reflector casing 37 are electric light bulbs 47, 48 and 49. The bulb 47 is behind the opening 39, and the bulb 49 is behind the opening 40, while the bulb 48 is behind the opening 41. The reflector casing 37 is secured in the casing 14 of the rear traffic signal by the bracket 22$^a$ similar to the bracket 22. The casing 14 of the rear traffic signal is carried by a bracket 50, which is angular and provided with a forwardly extending lug 51 having a vertical opening 52, to receive the vertical portion 53 of the angular arms 54, the plate 55 of which is secured by bolts 56 to the rear portion of the automobile. A set bolt 57 is threaded in the lug 51, to secure the bracket 50 and the lug 51 upon the arm 54. The bracket 50 has a downwardly extending flange 58, to which, by means of bolts 59, the usual license number plate 50 is secured, in such wise as the light penetrating the white glass 43 may be reflected thereon. Carried by the three spokes 61 of the steering wheel 62, are three push buttons 63, 64 and 65. The push button 63 is wired by means of the lead 66 to the bulb 33, from which a lead or wire 70 extends to the battery 71, there being a lead or wire 71$^a$ extending from the battery 71 to the bulb 49. A lead 49$^a$ extends from the bulb 49 to the push button 63. Also extending from the bulb 49 is a wire 47$^a$, which in turn connects to the bulb 47. Extending from the push button 65, and connected to the bulb 35, is a wire or lead 69, and extending from the bulb 33 to the bulb 47 is a lead or wire 72. A suitable wire or lead 72$^a$ connects the bulb 47 and the battery 73, and connecting the battery 73 and the push button 65 is a wire or lead 73$^a$. Pivotally supported upon the pin 74 of a bearing bracket 75 (which is carried by the floor of the automobile) is a foot pedal 76 (which may be connected in any suitable manner, not shown, to the brake mechanism, not shown, for slowing up the automobile) having its arm 77 provided with a strap 82, which is constructed of any suitable insulating material. This strap 82 is secured upon the arm 77 by means of a bolt 83, which also secures a contacting terminal 84$^a$ in place. This terminal 84$^a$ is designed to coöperate with the terminal 78, which is carried by the base plate 79, which in turn is supported upon the insulating block 80, which is secured to the floor of the automobile. Extending from the contacting terminal 78 and connected to the lead or wire 73$^a$ is a lead or wire 87. Connected to the terminal contact 84 (which is secured between the ears 85 of said strap 82) is a wire or lead 86, which in turn is connected at 86$^a$ to the wire or lead 71$^a$. The push button 64 is connected to the bulb 34 by means of the leads or wires 67, there being a battery 68. Extending from the bulb 48 are two wires or leads 48$^a$, which wires or leads may be connected to the usual tail lamp wiring and battery, including the switch (all of which are not shown), so that when the switch not shown is operated to close the circuit with the bulb 48, the tail lamp or bulb 48 (which is reflected through the ruby glass and through the opening in the bottom of the casing upon the license number) will remain lighted at all times during the night, thereby taking the place of the usual tail lamp upon automobiles. The wiring in Fig. 10 may be carried out in any suitable manner, for instance, it may be connected to the magneto circuit, or otherwise installed. Each of the buttons 63, 64 and 65 is connected to the respective spoke of the steering wheel by means of a clamping plate 91 and screw 92.

Referring to the drawings, it is to be seen that by pressing the button 64, the bulb 34 will light, indicating to the traffic officer that the direction of the machine or automobile is straight ahead. When pressing the button 65, it is to be seen that by tracing the circuit over the wires or leads 69, 72, 72ª and 73, the bulbs 35 and 47 will light, thereby indicating by the arrows, to the traffic officer in front of the machine or automobile and the following machine or automobile, that the automobile will turn to the right. By depressing the button 63 and tracing the circuit over the wires 66, 49ª and 71ª and 70, the bulbs 33 and 49 will light, thereby indicating by the arrows in front of these bulbs that the automobile will turn to the left. When it is desired to indicate to the driver of a machine following in the rear that the forward machine is to slow up, the operator applies his foot to the plate 90 of the foot pedal 76, applying the brakes, and at the same time lighting both bulbs 47 and 49 without lighting the bulbs 33 and 35, thereby indicating that the automobile is to slow up. By tracing the circuit when the pedal 76 is depressed, it is to be seen that both lamps 47 and 49 will light, without actuating the bulbs 33 and 35. A good driver, when signaling to the traffic officer and a following machine, when it is the intention to turn to the right or the left, will instantly impart the proper signal, and then instantly subsequently impart the slowing up signal to the following machine.

The invention having been set forth, what is claimed as new and useful is:—

In a traffic signal, a casing provided with an open face and having a closure for said open face, a support for said casing, a reflector casing within the first casing and provided with three compartments, each having illuminating means therein, said closure consisting of a rectangular frame having an elongated rectangular opening, the inner marginal edge of which extends inwardly toward the reflector casing, a colored glass secured in the opening of the frame of the closure, a stencil clamped between the inwardly extending marginal edge of the opening of the closure frame and the marginal edge of the reflector casing, said stencil having three openings, one for each compartment, and each indicating a different signal, and means for supporting the reflector casing within the first casing.

In testimony whereof I have signed my name to this specification in the presence of two subscribing witnesses.

FRED J. KOCH.

Witnesses:
 JOHN SCHMIDT,
 FRED BEINE.